United States Patent [19]
Hurst

[11] 3,917,054
[45] Nov. 4, 1975

[54] METHOD FOR HANDLING ARTICLES OF PARAMAGNETIC MATERIAL

[75] Inventor: Robert L. Hurst, Muncie, Ind.

[73] Assignee: Ball Corporation, Muncie, Ind.

[22] Filed: Dec. 20, 1972

[21] Appl. No.: 316,952

Related U.S. Application Data

[62] Division of Ser. No. 99,485, Dec. 18, 1970, Pat. No. 3,712,450, which is a division of Ser. No. 784,845, Dec. 18, 1968, Pat. No. 3,641,959.

[52] U.S. Cl. .................. 198/266; 198/32; 198/41
[51] Int. Cl.² ........................................ B65G 47/24
[58] Field of Search........... 198/41, 33 AD, 32, 238, 198/266, 285; 214/1 Q

[56] References Cited
UNITED STATES PATENTS

| | | | |
|---|---|---|---|
| 1,773,646 | 8/1930 | Skov | 198/41 |
| 3,120,891 | 2/1964 | Cmiel | 198/41 |
| 3,215,289 | 11/1965 | Gleason | 198/41 |
| 3,270,903 | 9/1966 | Willms | 198/33 AD |
| 3,338,374 | 8/1967 | Dudley | 198/41 |
| 3,523,602 | 8/1970 | Mojden et al. | 198/41 |
| 3,712,453 | 1/1973 | Hurst | 198/41 |

OTHER PUBLICATIONS
Bunting Magnetics Company, "Guide to Magnetic Conveying and Handling," 12/30/66.

*Primary Examiner*—Evon C. Blunk
*Assistant Examiner*—Richard K. Thomson
*Attorney, Agent, or Firm*—James D. Haynes

[57] ABSTRACT

A method is disclosed for handling articles such as metal discs for closures of the two-piece type which are stamped and formed and then fed sealing face down to first conveyor belts. At a transfer zone, each disc or lid is pulled up against the lower pass of a second conveyor belt by a magnet. The lids are retained in contact with the second belt by a magnetic pulley to swing up through an arc to the upper pass of the belt. Lids are then conveyed to a treating zone. The speeds of the first conveyor belts are regulated to cause closures disposed on each belt to arrive simultaneously at the transfer zone.

2 Claims, 6 Drawing Figures

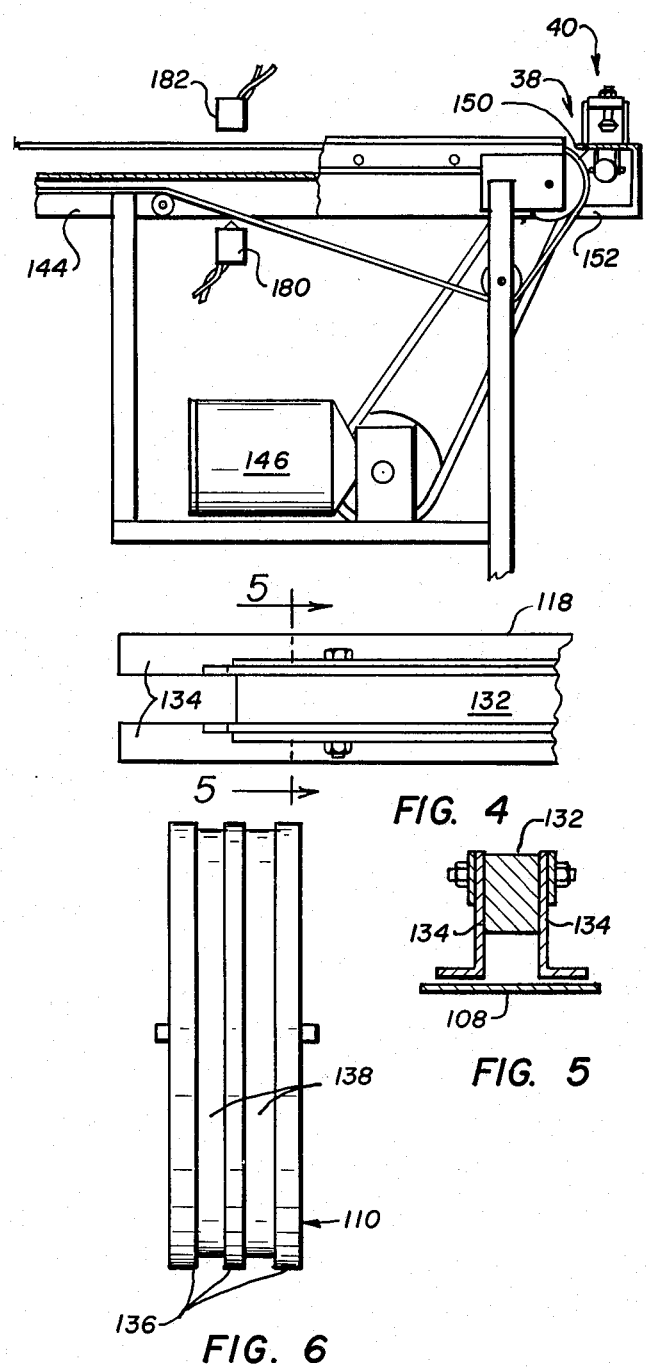

METHOD FOR HANDLING ARTICLES OF PARAMAGNETIC MATERIAL

CROSS-REFERENCE TO RELATED APPLICATION

This application is a division of my copending application Ser. No. 99,485, filed Dec. 18, 1970 and entitled "Method for Handling Articles, (now U.S. Pat. No. 3,712,450, issued Jan. 23, 1973)" which application was a division of my then copending application Ser. No. 784,845, filed Dec. 18, 1968 and entitled "Method and Apparatus for Producing Closures" (now U.S. Pat. No. 3,641,959, issued Feb. 15, 1972).

BACKGROUND OF THE INVENTION

Glass jars have been used for many years for the purpose of home canning of fruits and vegetables, and many types of closures have been evolved for sealing such jars. Of the many early types, Putman's "Lightning Jar," which utilized a glass cover plate, the margin of which pressed an annular rubber gasket against the margin of the jar mouth with the cover plate held tight by a toggle operated bail, and Mason's screw threaded jar fitted with a zinc cap having mating threads on the flange to hold rubber gasket material against the jar to form a top seal, were particularly popular.

Subsequently, two-piece closures were developed comprising a disc type lid having a concave margin to seat on the margin of the jar mouth, the concave margin being coated with a gasket material formed in place such as cured latex and, more recently, plastisol, the lid being clamped in place by a flanged and threaded band which engaged corresponding threads on the jar mouth and the periphery of the lid. The two-piece closure has come into widespread use because the bands may be used repeatedly so that only the lids need be replaced for each new use.

Prior practice in the manufacture of the lids has been rather inefficient and relatively costly because of a large amount of manual handling, which also results in lower production than might otherwise be realized for effort expended. The lids are very thin and may be easily deformed. Moreover, they are commonly treated on the sealing face to prevent corrosion by the contents of a jar and it is essential to avoid scratching the protective coating which would render them unusable. It has been common after each operation to place, or stack, the lids in a storage bin. They then have to be sorted out and fed uniformly into the next operating stage. When gasket material to be formed in place is applied to the concave marginal seat, it is in viscous form but still quite subject to running or spreading if the lid is tilted or jarred laterally while it is traveling to a curing station. A large proportion of two-piece closures have been assembled by hand, and this, too, has proved to be cumbersome as well as expensive.

SUMMARY OF THE INVENTION

The present invention overcomes some difficulties mentioned above to provide a method which eliminates manual operation. The articles are accurately controlled at every stage to prevent damage of any kind. As a result, production rates have been increased substantially, while at the same time greatly enhancing uniformity and quality of product.

Generally stated, the method generally includes the transfer of the disc-shaped lids. The lids are sequentially supplied to the end of a conveyor of the endless loop belt type with the first or sealing face down, and delivered therefrom sequentially to a first transfer zone. At this transfer zone, a second belt conveyor is arranged to overlie the end of the first conveyor and extends horizontally in a direction perpendicular to the longitudinal axis of the first conveyor. The second conveyor and associated components and conveyors are featured in this invention as claimed herein.

The lower pass of the second conveyor is slightly spaced above the upper pass of the first conveyor and a magnet, preferably of the ceramic encapsulated type, closely overlies the lower pass of the second conveyor at the juncture. The magnetic field created by the magnet is sufficient to pull each lid up as it reaches the juncture and hold it against the second conveyor belt, as the latter moves the lid away from the juncture. The lids are held in contact with the belt as they move upward in an arc of about 180 degrees by magnets on the pulley which guides the second conveyor belt into a return course so that the lids become inverted with their first or sealing faces up to receive the sealing material.

The lids are then moved onward as the upper pass of the second conveyor moves to a third conveyor from where they are delivered sequentially to a first treating zone and fed thereat onto a coating table at selected intervals along its periphery. There are no manual operations in this entire sequence and the lids are completely protected against damage.

BRIEF DESCRIPTION OF THE DRAWINGS

Various other advantages and features of novelty will become apparent as the description proceeds in conjunction with the accompanying drawings, in which:

FIG. 4 is a top plan view, on line 4—4, of a portion of the stationary magnet of FIG. 3;

FIG. 5 is a sectional view taken on line 5—5 of FIG. 4;

FIG. 6 is an elevational view, on line 6—6 of FIG. 3, showing the magnetized rotatable pulley.

DESCRIPTION OF PREFERRED EMBODIMENTS

Figure 1:
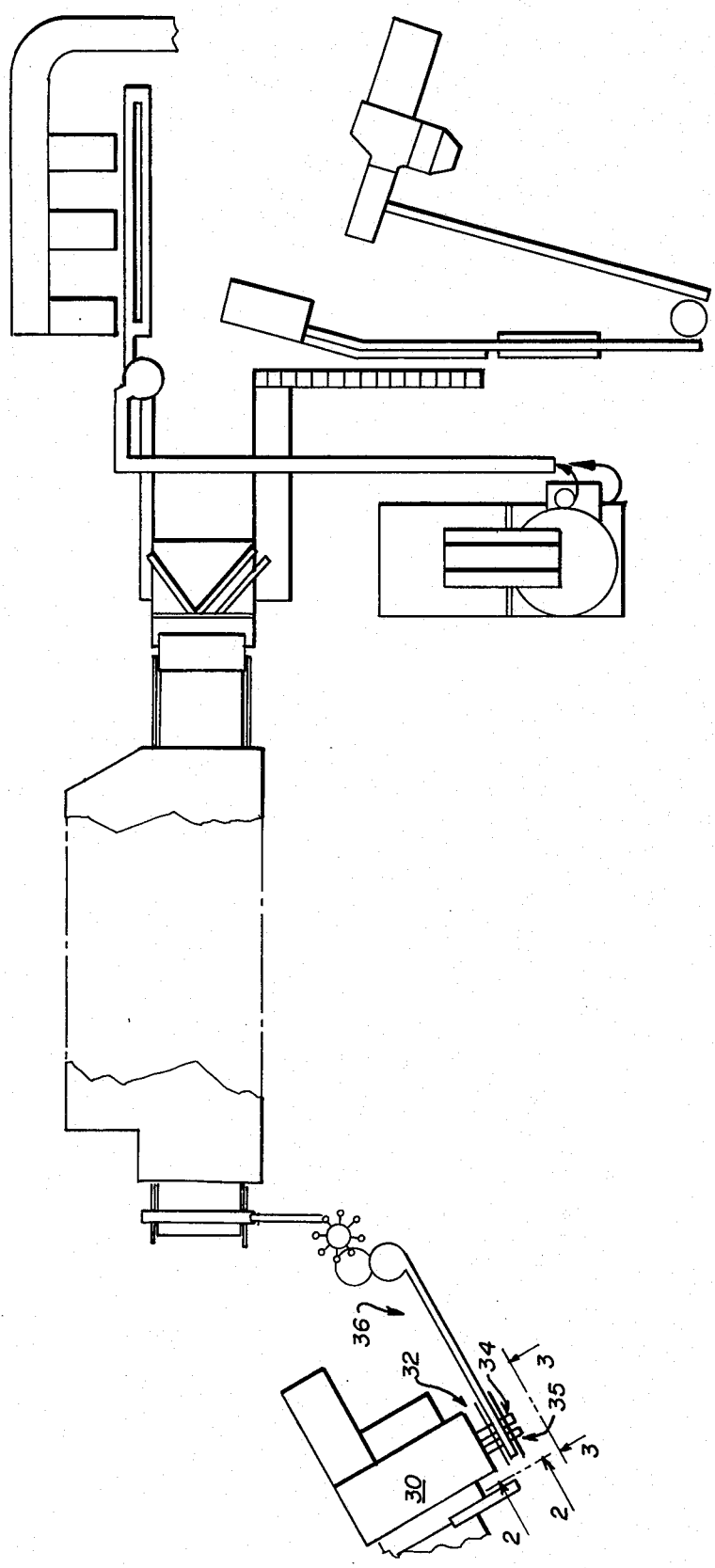
FIG. 1 is a schematic view, in plan form, showing the various parts of an apparatus constructed in accordance with the invention.

The total apparatus for the practice of the invention is schematically illustrated in FIG. 1, where a stamping and forming machine 30 operates continuously to stamp discs from sheet stock and form them into closure lids by producing a concave sealing margin around the entire periphery of the lid, which margin is coated with a thin layer of sealing material, which may be latex or a plastisol, the latter being presently preferred. The plastisol is subsequently cured in an oven to a rubber-like consistency and is adapted to make sealing contact with the mouth of a typical Mason-type jar in use.

The machine 30 sequentially supplies lids with their first, or sealing, face down to a first conveyor 32. The conveyor then sequentially delivers the lids to a first transfer zone 34, where inverter means 35 inverts the lids and moves them onward. The inverter means includes the delivery end of a second conveyor 36. By the use of magnetic means to be later described, the lids are sequentially transferred to the second conveyor with their second faces in contact with the conveyor belt, and are held in contact with the belt while it passes around an end loop pulley, with the result that the lids now travel along the upper pass of the second conveyor with their first faces up.

STAMPING AND FORMING MEANS — FIRST CONVEYOR

The stamping and forming machine 30 is a high-speed closure press capable of stamping and forming closure lids at a high rate of speed, e.g., at the rate of 500 per minute or more for lids up to a diameter of about 86 mm. Any one of a number of commercially available presses may be used for this phase of the operation. Although the press shown in the drawings includes a two-out die, it is to be understood that the number of dies may vary as desired or required.

As the lids 100 are ejected from machine 30, they slide down inclined ramp 102 onto the conveyor 32 for delivery to the first transfer zone 34. Since the machine is equipped with two side-by-side dies, the lids come to the conveyor in laterally spaced relation. Therefore, conveyor 32 is provided with two laterally spaced belts 104, 106, preferably of the fabric type, which are aligned with the delivery paths of the lids 100. The dies of machine 30 operate alternately and accordingly, the lids are deposited in staggered array. In order that a pair of lids may arrive simultaneously at the first transfer zone in side-by-side relation, the two belts are individually speed-controlled so that one will travel slightly faster than the other. One preferred way is through the appropriate selection of the size of the sprockets which drive the belts. Since machine 30 delivers the lids to conveyor 32 with their first, or sealing, faces down, it is necessary to invert them before they are delivered to the first treating zone where the sealing material is to be applied to the concave seats.

INVERTER MEANS

The lids are conventionally made from commercially available tin plate which is a paramagnetic material, and it is therefore possible to utilize magnetic means for inverting the lids and carrying out other steps in the process. The inverter means 35 for automatically inverting the lids as they are transferred from the first conveyor 32 to the second conveyor 36 will now be described.

Figure 2:
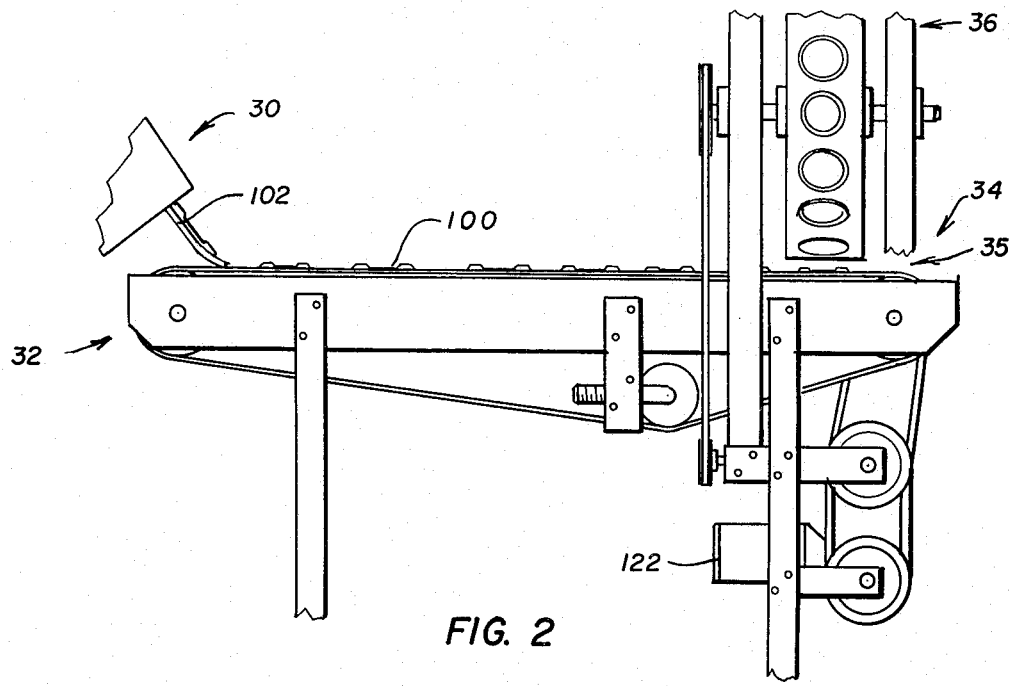
FIG. 2 is a side elevational view, on line 2—2 of FIG. 1, of the means for automatically inverting closure lids while transferring same between conveyors.
Figure 3:
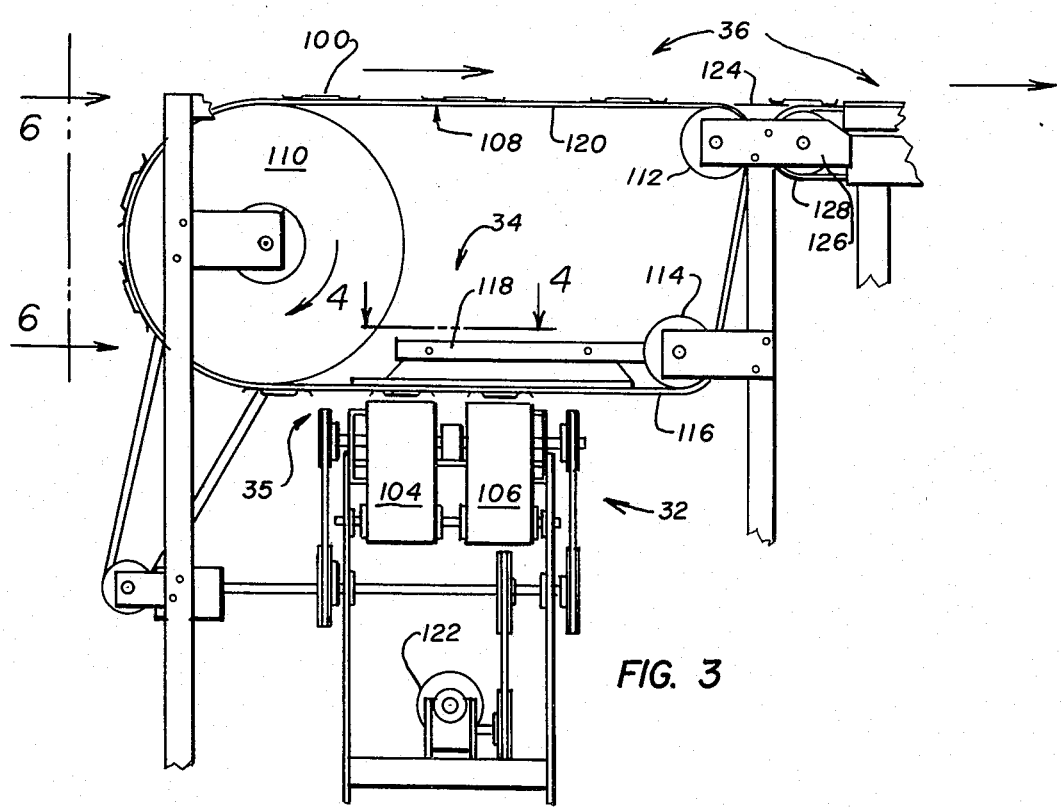
FIG. 3 is a front elevational view, on line 3—3 of FIG. 1, of the apparatus of FIG. 2.

Considering FIGS. 1 to 3 particularly, it will be noted that conveyors 32 and 36 travel essentially horizontally, as do the other conveyors in the apparatus. The longitudinal axis of conveyor 36 is substantially perpendicular to that of conveyor 32 and it is provided with a first single endless loop type belt 108 carried by pulleys 110, 112, and 114 so that it traverses the delivery end of belts 104 and 106 as best seen in FIG. 3. The lower pass 116 of belt 108 is spaced above belts 104 and 106 sufficiently to provide a slight clearance for lids 100. A stationary magnet 118 is mounted closely above lower pass 116 at the juncture of the two conveyors and creates a magnetic field which picks up each pair of lids as they arrive at the transfer zone and retains them with their second faces in contact with belt 108.

Pulley 110 guides the belt in an upward arc of about 180° and is magnetized to retain the lids in contact with the belt. The pulley is laterally adjacent to conveyor 32 as well as to magnet 118 and therefore as the lids are moved to the left, viewed in FIG. 3, until they leave the field of magnet 118 they are subjected to the magnetic field of the pulley so that the field is substantially continuous. When they have completed their arcuate movement they are in inverted attitude on the upper pass 120 of belt 108, with their first faces up.

The first and second conveyors are driven through various conventional sprockets and chains by motor 122, and the drive ratios are selected to give the desired results. It is, of course, essential that the pickup of one pair of lids is not interfered with by the arrival of the next pair at the transfer point. Considering FIG. 3, it will be apparent that the lid picked up from belt 106 must be carried to the left of belt 104 before the next pair of lids arrives. Therefore the speed of belts 104 and 106 is selected relative to the rate of production of machine 30 to provide substantial gaps between each successive pair of lids, and belt 108 is driven at a greater lineal speed than belts 104 and 106. It will be noted that the transfer of the lids from the first conveyor to the second conveyor results in changing them from a dual line to a single file arrangement which is desired for certain subsequent operations.

Continued movement of belt 108 brings the lids to transfer plate 124 which bridges a narrow gap between pulley 112 and pulley 126 which guides the reversal of belts 128 and 130, the latter two belts constituting a continuation of conveyor 36. The upper surface of transfer plate 124 is provided with a plating or a coating of a low friction plastic material, and the momentum of the lids is sufficient to cause them to slide across plate 124 and onto continuation belts 128 and 130. If any of the lids slows down, it will be pushed across by succeeding lids.

The fixed or stationary magnet 118 of FIG. 2 is shown in greater detail in FIGS. 4 and 5 where the magnet body 132 is in the form of a rectangular parallelopiped and is flanked by a pair of paramagnetic bars 134 of angle cross section. The body 132 consists of a commercially available ceramic encapsulated magnet, and all other magnets used in the apparatus are of a similar type. Pulley 110 is made up of three paramagnetic discs 136 sandwiching two magnet discs 138 between them as seen in FIG. 6.

It will be apparent to those skilled in the art that various changes may be made in the construction and operation of the system disclosed without departing from the spirit of the invention, and it is intended that all such changes shall be embraced within the scope of the following claims.

What is claimed is:

1. A method of moving articles of paramagnetic material from one location to another and inverting the articles during such movement, comprising: establishing a transfer zone; creating a first, stationary, magnetic field at said transfer zone; creating a second, movable, magnetic field at said transfer zone adjacent to said first field; establishing a dual path of travel from the selected location to the transfer zone; sequentially moving a plurality of said articles along both components of said dual path to deliver a pair of articles, in side-by-side relation, simultaneously to the transfer zone; simultaneously subjecting said pair of articles to the first magnetic field and moving said articles in single file along a new path lateral to the dual path; continuing to move said articles along the new path out of said first field and into said second field; rotating said second magnetic field about a horizontal axis to restrain said article to movement in the new path through a vertical arc of about 180°; and sequentially repeating the transfer process with each succeeding pair of articles to establish a continuous single file of articles traveling along said new path.

2. A method as claimed in claim 1, further including supplying said articles at said selected location alternately at timed intervals to the two components, resulting in a staggered relation; and moving the articles along the two components of the dual path at different lineal speeds to cause two articles to arrive side-by-side simultaneously at the transfer zone.

* * * * *